United States Patent [19]

Kennedy et al.

[11] Patent Number: 4,988,654

[45] Date of Patent: Jan. 29, 1991

[54] DUAL COMPONENT CRACKING CATALYST WITH VANADIUM PASSIVATION AND IMPROVED SULFUR TOLERANCE

[75] Inventors: James V. Kennedy, Greenbrae; Lawrence W. Jossens, Albany, both of Calif.

[73] Assignee: Chevron Research Company, San Francisco, Calif.

[21] Appl. No.: 459,094

[22] Filed: Dec. 29, 1989

[51] Int. Cl.$^5$ ............................................. B01J 29/04
[52] U.S. Cl. ..................................... 502/84; 502/250; 502/251; 502/340; 502/341; 502/353; 502/240; 502/64; 502/67; 502/68; 208/216 PP
[58] Field of Search ..................... 502/84, 64, 67, 68, 502/240, 251, 340, 353; 208/216 PP

[56] References Cited

U.S. PATENT DOCUMENTS

| | | | |
|---|---|---|---|
| 4,196,102 | 4/1980 | Inooka et al. | 502/74 |
| 4,343,723 | 8/1982 | Rogers et al. | 502/84 |
| 4,439,312 | 3/1984 | Asaoka et al. | 208/216 PP |
| 4,465,779 | 8/1984 | Occelli et al. | 502/68 |
| 4,466,884 | 8/1984 | Occelli et al. | 208/120 |
| 4,707,461 | 11/1987 | Mitchell et al. | 502/64 |
| 4,929,338 | 5/1990 | Wormsbecher | 502/64 |

*Primary Examiner*—Anthony McFarlane
*Assistant Examiner*—Nhat Phan

[57] ABSTRACT

A dual component cracking catalyst system is disclosed comprising zeolite as a first component and a mixture of a calcium/magnesium-containing material and a magnesium-containing material as a second component. The preferred calcium/magnesium-containing material is dolomite and the preferred magnesium-containing material is sepiolite.

19 Claims, 1 Drawing Sheet

DUAL COMPONENT CRACKING CATALYST WITH VANADIUM PASSIVATION AND IMPROVED SULFUR TOLERANCE

FIELD OF THE INVENTION

This invention relates to an improved catalyst composition for use in the conversion of hydrocarbons to lower-boiling fractions. More particularly, the invention comprises a dual component catalyst system for fluid catalytic cracking demonstrating vanadium passivation and improved sulfur tolerance. The catalyst comprises a catalytically active crystalline aluminosilicate zeolite, and as a separate and distinct entity, a diluent, said diluent comprising an admixture of a calcium-containing material and a magnesium-containing material.

In ordinary catalytic cracking processes, various metallic contaminants which may be present in hydrocarbonaceous feedstock, particularly vanadium, nickel and iron, cause the degradation and/or deactivation of the catalytic cracking catalyst. Particularly susceptible to vanadium contamination are crystalline aluminosilicate zeolites, either natural or synthetic. This deactivation causes distillate yield loss, particularly through loss of active acid cracking sites, as well as metal poisoning via secondary dehydrogenation and coking reactions caused by the deposition of these heavy metals on the catalyst. Remedial technology has evolved in various ways to deal with this metals contaminant problem. One mechanism which has evolved includes the use of various diluents as metals passivators or traps, which contain materials which will chemically combine with and effectively tie up the offending materials. These traps have proved particularly effective with regard to vanadium.

One particular strategy involves the use of dual particle systems wherein the cracking catalyst, usually zeolitic, is contained on one particle or component of the system, and a diluent or vanadium trap is contained as a separate, distinct entity on a second particle or component of the system. U.S. Pat. No. 4,465,588, Occelli et al., discloses a process for cracking high metals content feedstock using a novel catalyst cracking composition comprising a solid cracking catalyst and a separate and distinct diluent containing materials selected from a selected magnesium compound or a selected magnesium compound in combination with one or more heat-stable metal compounds. Among the magnesium-containing compounds specified is magnesium clay sepiolite. U.S. Pat. No. 4,465,779 teaches the cracking catalyst of '588 itself. U.S. Pat. No. 4,615,996, Occelli, teaches a dual-function cracking catalyst composition comprising a solid cracking catalyst and a separate, distinct particle diluent containing substantially catalytically inactive crystalline alumino-silicate U.S. Pat. No. 4,466,884, Occelli et al., teaches a process wherein the separate and distinct entity diluent contains antimony and/or tin, supported on a inert base selected from the group consisting of magnesium-containing clay minerals, including sepiolite. U.S. Pat. No. 4,650,564, Occelli et al., also teaches a process for cracking high metals content feedstock comprising contacting the feed with a dual particle catalyst cracking composition comprising a solid cracking catalyst and, as a separate and distinct entity, an alumina diluent. U.S. Ser. No. 909,819, Occelli et al., also teaches a dual particle catalytic cracking system comprising a cracking catalyst and a second component comprising magnesium oxide. U.S. Pat. No. 4,707,461, Mitchell et al., discloses a catalyst composition comprising zeolite, matrix, and a calcium-containing additive comprising substantially amorphous calcium silicate as a separate and discrete component. A preferred calcium additive component comprises dolomite.

One primary issue involving the use of the dual particle systems in fluid catalytic cracking is that the effect of the diluent particle on yield is such that the activity of the active catalyst must be very high in order to compensate for the diluent effect. It would therefore be helpful to develop a dual particle catalyst wherein the diluent could be added in low amounts and have enhanced metals scavenging ability, in particular vanadium. Secondarily, it would be advantageous for the catalyst system to demonstrate higher sulfur tolerance than previous known systems, as some feeds requiring processing have high enough sulfur levels to cause process difficulties with known catalysts.

SUMMARY OF THE INVENTION

The present invention comprises a dual particle catalyst system for use in catalytic cracking which employs, as a separate and distinct entity, a diluent particle which, among other factors, demonstrates prevention of activity dilution and good sulfur tolerance. Said catalyst comprises a first component comprising a cracking catalyst having high activity, and, a second component, as a separate and distinct entity, the second component comprising a calcium/-magnesium-containing material in combination with a magnesium-containing material, wherein the calcium/magnesium-containing compound is active for metals trapping, especially vanadium trapping. The preferred calcium/magnesium-containing material is dolomite and the preferred magnesium-containing material is sepiolite.

BRIEF DESCRIPTION OF THE DRAWINGS

A preferred process for using the catalyst composition of this invention is in fluid catalystic cracking. A suitable reactor-generator for carrying out such a process is shown in the attached FIG. 1.

DETAILED DESCRIPTION OF THE INVENTION

Figure 1:
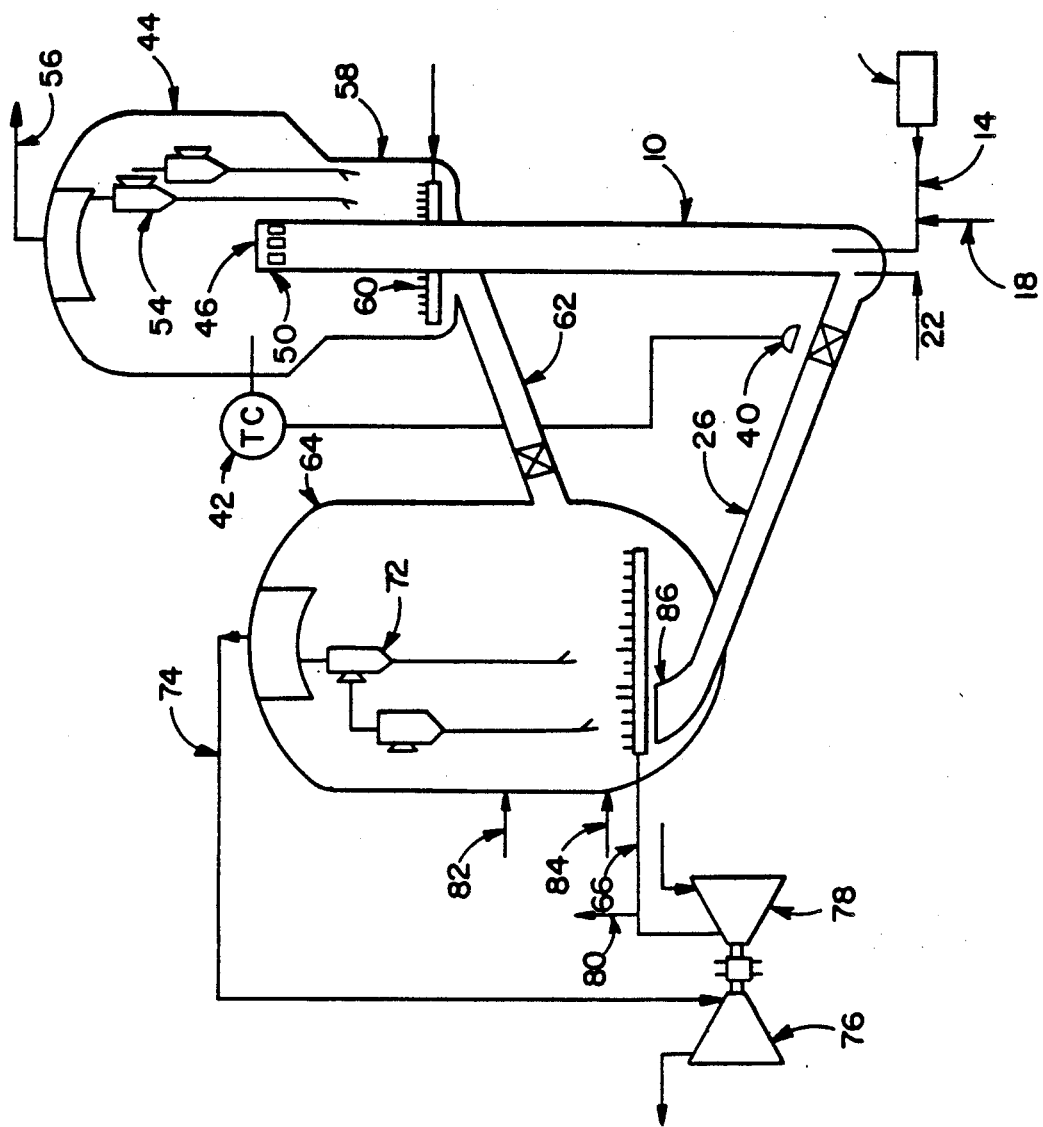

The catalyst composition of the present invention comprises a dual particle catalyst system, the first component of which comprises a crystalline aluminosilicate zeolite preferably contained within a matrix material, and the second component of which comprises a diluent having an effectiveness for metals passivation, wherein said diluent comprises a. calcium-containing material admixed with a magnesium-containing material. The improvement of the present invention resides in the ability of the catalyst system to function well even when the catalyst carries a substantially high level of metals on its surface and the feedstock may also contain high levels of sulfur, especially greater than about 0.5% sulfur in the feed.

Cracking Catalyst Component

The cracking catalyst component of the novel catalyst composition can be any cracking catalyst of any desired type having high activity. By "high activity" we mean catalyst of fresh MAT Activity above about 1.0, preferably up to about 4.0, or even higher, where $$\text{Activity} = \frac{\text{Wt \% Conversion}}{100 - \text{Wt \% Conversion}}$$

The "MAT Activity" was obtained by the use of a microtest (MAT) unit similar to the standard Davison MAT (see Ciapetta et al., Oil & Gas Journal, 65, 88 (1967).

Preferably, the host catalyst used herein is a catalyst containing a crystalline aluminosilicate, preferably exchanged with rare earth metal cations, sometimes referred to as "rare earth-exchanged crystalline aluminum silicate" or one of the stabilized hydrogen zeolites.

Typical zeolites or molecular sieves having cracking activity which can be used herein as a catalytic cracking catalyst are well known in the art. Suitable zeolites are described, for example, in U.S. Pat. No. 3,660,274 to Blazek et al., or in U.S. Pat. No. 3,647,718 to Hayden et al., which are incorporated herein by reference. Synthetically prepared zeolites are initially in the form of alkali metal aluminosilicates. The alkali metal ions are typically exchanged with rare earth metal and/or ammonium ions to impart cracking characteristics to the zeolites. The zeolites are crystalline, three-dimensional, stable structures containing a large number of uniform openings or cavities interconnected by smaller, relatively uniform holes or channels The effective pore size of synthetic zeolites is suitably between 6 and 15 Å in diameter. The overall formula for the preferred zeolites can be represented as follows:

$$H_{(2-x)}\cdot XM_{2/n}O:Al_2O_3:1.5-6.5\ SiO_2:yH_2O$$

where M is a metal cation and n its valence and x varies from 0 to 1 and y is a function of the degree of dehydration and varies from 0 to 9. M is preferably a rare earth metal cation such as lanthanum, cerium, praseodymium, neodymium or mixtures of these.

Zeolites which can be employed herein include both natural and synthetic zeolites. These zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like. The faujasites are preferred. Suitable synthetic zeolites which can be treated in accordance with this invention include zeolites X, Y, including chemically or hydrothermally dealumintated high silica-alumina Y, A, L, ZK-4, beta, ZSM-types or pentasil, boralite and omega. The term "zeolites" as used herein contemplates not only aluminosilicates but substances in which the aluminum is replaced by gallium or boron and substances in which the silicon is replaced by germanium. The preferred zeolites for this invention are the synthetic faujasites of the types Y and X or mixtures thereof.

To obtain good cracking activity the zeolites have to be in a proper form. In most cases this involves reducing the alkali metal content of the zeolite to as low a level as possible Further, a high alkali metal content reduces the thermal structural stability, and the effective lifetime of the catalyst will be impaired as a consequence thereof. Procedures for removing alkali metals and putting the zeolite in the proper form are well known in the art, for example, as described in U.S. Pat. No. 3,537,816.

The crystalline aluminosilicate zeolites, such as synthetic faujasite, will, under normal conditions, crystallize as regularly shaped, discrete particles of approximately 1 to 10 microns in size, and, accordingly, this is the size range normally used in commercial catalysts. The particle size of the zeolites can be, for example, from about 0.1 to about 10 microns, but generally from about 1 to about 5 microns or less. Crystalline zeolites exhibit both an interior and an exterior surface area, with the largest portion of the total surface area being internal. Blockage of the internal channels by, for example, coke formation and contamination by metals poisoning will greatly reduce the total accessible surface area, and, thereby, the efficiency of the catalyst.

The crystalline alkali metal aluminosilicate can, therefore, be preferably cation-exchanged by treatment with a solution essentially characterized by a pH in excess of about 4.5, preferably by a pH in excess of 5, and containing an ion capable of replacing the alkali metal and activating the catalyst, excepting in the case of rare earth cations where the pH should be less than 5.0 but greater than 4.0. The alkali metal content of the finished catalyst should be less than about 1 and preferably less than about 0.5 percent by weight. The cation-exchange solution can be contacted with the crystalline aluminosilicate of uniform pore structure in the form of a fine powder, a compressed pellet, extruded pellet, spheroidal bead or other suitable particle shapes. Desirably, the zeolite comprises from about 3 to about 60, preferably from about 10 to about 40, and more preferably from about 20 to about 40 weight percent of the total catalyst inventory.

The zeolite is preferably incorporated into a matrix. Suitable matrix materials include the naturally occurring clays, such as kaolin, halloysite and montmorillonite and inorganic oxide gels comprising amorphous catalytic inorganic oxides such as silica, silica-alumina, silica-zirconia, silica-magnesia, alumina-boria, alumina-titania, and the like, and mixtures thereof. Preferably the inorganic oxide gel is a silica-containing gel, more preferably the inorganic oxide gel is an amorphous silica-alumina component, such as a conventional silica-alumina cracking catalyst, several types and compositions of which are commercially available. These materials are generally prepared as a co-gel of silica and alumina, co-precipitated silica-alumina, or as alumina precipitated on a pre-formed and pre-aged hydrogel. In general, silica is present as the major component in the catalytic solids present in such gels, being present in amounts ranging between about 55 and 100 weight percent. The matrix component may suitably be present in the catalyst of the present invention in an amount ranging from about 40 to about 92 weight percent, preferably from about 60 to about 80 weight percent, based on the total catalyst.

Especially preferred as the catalytically active component of the catalyst system claimed herein is a crystalline aluminosilicate, such as defined above, dispersed in a refractory metal oxide matrix, for example, as set forth in U S. Pat. No. 3,944,482 to Mitchell et al., referred to above.

The matrix material in the host catalyst can be any well-known heat-stable or refractory metal compounds, for example, metal oxides, such as silica, alumina, magnesia, boron, zirconia, or mixtures of these materials or suitable large pore clays, pillared or cross-linked clays or mixed oxide combinations.

The particular method of forming the catalyst matrix does not form a part of this invention. Any method which produces the desired cracking activity characteristics can suitably be employed. Large pored refractory metal oxide materials suitable for use as a matrix can be obtained as articles of commerce from catalyst manufacturers or they can be prepared in ways well known in the art such as described, for example, in U.S. Pat. No. 2,890,162, the specification of which is incorporated herein by reference.

The method of forming the final composited catalyst also forms no part of this invention, and any method well known to those skilled in this art is acceptable. For example, finely divided zeolite can be admixed with the finely divided matrix material, and the mixture spray dried to form the final catalyst. Other suitable methods are described in U.S. Pat. Nos. 3,271,418; 3,717,587; 3,657,154; and 3,676,330; whose descriptions are incorporated herein by reference. The zeolite can also be grown in the matrix material if desired, as defined, for example in U.S. Pat. No. 3,647,718 to Hayden et al., or U.S. Pat. No. 4,493,902 to Brown, et al., referred to above.

A catalytically inert porous material may also be present in the finished catalyst. The term "catalytically inert" refers to a porous material having substantially no catalytic activity or less catalytic activity than the inorganic gel component or the clay component of the catalyst. The inert porous component can be an absorptive bulk material which has been pre-formed and placed in a physical form such that its surface area and pore structure are stabilized. When added to an impure inorganic gel containing considerable amounts of residual soluble salts, the salts will not alter the surface pore characteristics measurably, nor will they promote chemical attack on the pre-formed porous inert material. Suitable inert porous materials for use in the catalyst of the present invention include alumina, kaolin, halloysite, titania, silica, zirconia, magnesia, and mixtures thereof. The porous inert material, when used as a component of the catalyst of the present invention, is present in the finished catalyst in the amount ranging from about 10 to about 30 weight percent based on the total catalyst.

Diluent Component

The second component of the catalyst system defined herein is a separate and distinct entity, and comprises a diluent compositionally comprising two different compounds, said diluent preferably being held together by a binder to impart structural integrity to the second component. These subcomponents each bring their own characteristics and qualities to the invention, and interact synergistically to yield a catalyst of unique properties.

The first subcomponent comprises a magnesium-containing compound, preferably a hydrous magnesium silicate, which may act as a matrix for the diluent, providing the medium for the active component to disperse within the diluent component itself. The preferred magnesium-containing compounds comprise hydrous magnesium silicate, more preferably sepiolite, (most preferably Spanish sepiolite), attapulgite, palygorskite, saponite, talc and Celkate T-21 ®, a synthetic amorphous magnesium silicate. It is preferred that the magnesium compound be in crystalline form, and low in both iron, potassium and sodium.

The second subcomponent comprises a calcium-containing material, in particular a calcium and magnesium containing material, which, under conditions found in catalytic cracking processes, transforms into active components. This transformed second subcomponent is the active component of the diluent, and particularly provides the necessary vanadium trapping activity appropriate to the effectiveness of the present invention.

The preferred calcium additive materials comprise dolomite, substantially amorphous calcium-magnesium silicate, calcium-magnesium oxide, calcium-magnesium acetate, and calcium-magnesium carbonate or subcarbonate. The most preferred material is dolomite.

The combination of the calcium-containing material and the magnesium-containing material and, in particular, the combination of dolomite and sepiolite, provides a diluent with a high calcium-magnesium composition, which is particularly effective for vanadium trapping and which is at the same time is attrition resistant and not so friable as to create process difficulties in catalytic cracking units. Moreover, the minerals involved, in particular dolomite, are relatively inexpensive, particularly relative to the zeolite component of the catalyst generally, thereby providing an economic advantage in view of the vanadium trapping efficiency of the diluent component.

The ratio of the two material one to the other is also a factor in the effectiveness of the catalyst system. It is preferred that the the calcium/magnesium-containing material and the magnesium-containing material be present in a weight ratio of from about 20:80 to about 80:20 calcium/magnesium-containing material to magnesium-containing material. More preferably, the ratio is from about 50:50 to about 70:30.

While the specific mechanism by which the diluent traps contaminants is not claimed as part of the present invention, one possible mechanism is suggested as follows. When fresh hydrocarbon feed contacts catalyst in the cracking zone, cracking and coking reactions occur. At the same time, vanadium is quantitatively deposited on the catalyst. Spent catalyst containing vanadium deposits passes from the cracking unit to the regenerator where temperatures normally in the range of 1150°-1400° F. (621°-760° C.) are encountered in an oxygen/steam-containing environment. Conditions are therefore suitable for vanadium migration to and reaction with the active zeolitic component of the catalyst. The reaction results in formation of mixed metal oxides containing vanadium which causes irreversible structural collapse of the crystalline zeolite. Upon degradation, active sites are destroyed and catalytic activity declines. Activity can be maintained only by adding large quantities of fresh catalyst at great expense to the refiner.

It is theorized that addition of the calcium-containing additive prevents the vanadium interaction with the zeolite by acting as a trap or sink for vanadium. Moreover, it has shown to be surprisingly good at minimizing vanadium catalyzed dehydrogenation reactions, that is reducing hydrogen make and coke make. In the regenerator, vanadium present on the catalyst particles preferentially migrates to and reacts with the calcium/magnesium-containing passivator. Competitive reactions are occurring and the key for successful passivation is to utilize an additive with a significantly greater rate of reaction toward vanadium than that displayed by the zeolite. As a result, the vanadium is deprived of its mobility, and the zeolite is protected from attack and eventual collapse. It is believed that vanadium and the calcium/magnesium additive forms one or more new binary oxides. The overall result is greatly increased levels of permissible vanadium and lower fresh catalyst make-up rates.

Binder

It is also preferred to include a separate binder which binds together the subcomponents of the diluent. The binder provides additional strength and attrition resistance, as well as surface area and dispersion known to capture vanadium or other metals, i.e., large porosity.

The preferred embodiment of the present invention would include from 5 to 30% by weight of an inorganic binder. The binder is used to impart density and strength and maintain particle integrity of the second component and is used in combination with the other subcomponents of the second particle. The inorganic binder can be those conventionally employed by those skilled in the art, including but not limited to clays such as kaolin, bentonite (montmorillonite), saponite and hectorite, or precipitated synthetic binders such as alumina, zirconia, titania, silica, silica-alumina, or derived from such standard commercially available materials as Catapal®, Chlorohydrol®, or SMM®, or combinations thereof.

In the preferred embodiment, the concentrations of the subcomponents in the diluent component can range from a ratio by weight of 20%:80% to 80%:20% dolomite:sepiolite, with the binder comprising between about 5% to 20% by weight. The most preferred composition comprises 50% dolomite, 40% sepiolite and 10% binder.

Catalyst Composition

The amounts of the various components in the catalyst system are adapted to suit the needs of the particular feed being employed. In general, the second particle or diluent comprises between 2% to 50% by weight of the entire circulating inventory, with the bulk of the remaining portion of the inventory comprising the active cracking catalyst. It is preferred that the diluent comprise between about 3% to 20% by weight of the circulating inventory, and most preferred, between about 5% to 10% by weight.

It is within the contemplation of the invention that other materials which improve the performance of the process may be also be included in the system. These could include other known metals passivators, such as antimony, tin or bismuth, etc., and/or promoters, such as Platinum Group metals, and/or octane enhancers, such as ZSM-5, silicalite or beta zeolites.

Suitable charge stocks for use with the present invention include crude oil, residuums or other petroleums fractions which are suitable catalytic cracking charge stocks except for the high metals contents. A high metals content charge stock for purposes of this invention is defined as one having a total metals concentration equivalent to or greater than a value of 10 as calculated in accordance with the following relationship:

$$10[Ni]+[V]+[Fe] \geq 10$$

where [Ni], [V] and [Fe] are the concentrations of nickel, vanadium and iron, respectively, in parts per million by weight. The process is particularly advantageous when the charge stock metals concentration is equal to or greater than 100 in the above equation. The concentration of metals may also be expressed in terms of vanadium alone, preferably between about 2-10 ppm by weight vanadium, more preferably between about 3-5 ppm. The contaminants may also be expressed in terms of vanadium on the catalyst at equilibrium: i.e. between about 2000 to 10,000 ppm by weight, more preferably between about 3000-5000 ppm.

It is to be understood that the catalyst compositions described above can be used in the catalytic cracking of any hydrocarbon charge stock containing metals, but is particularly useful for the treatment of high metals content charge stocks. Typical feedstocks are heavy gas oils or the heavier fractions of crude oil in which the metal contaminants are concentrated. Particularly preferred charge stocks for treatment using the catalyst composition of this invention include deasphalted oils boiling above about 900° F. (482° C.) at atmospheric pressure; heavy gas oils boiling from about 600° F. to about 1100° F. (343° C. to 593° C.) at atmospheric pressure; atmospheric or vacuum tower bottoms boiling above about 650° F. The charge stocks can also be derived from coal, shale or tar sands.

Process of the Preferred Embodiment

A preferred method for using the novel catalyst composition of this invention i$ in fluid catalytic cracking. A suitable reactor-regenerator for carrying out a process using the catalyst composition is shown in the attached FIG. 1. The cracking occurs in the presence of the fluidized catalyst composition defined herein in an elongated reactor tube 10 which is referred to as a riser. The riser has a length to diameter ratio of about 20 or above 25. The charge stock to be cracked is passed through preheater 2 to heat it to about 600° F. (315° C.) and is then charged into the bottom of riser 10 through the end of line 14. Steam is introduced into oil inlet line 14 through line 18. Steam is also introduced independently to the bottom of riser 10 through line 22 to help carry regenerated catalyst upwardly into the riser, which flows to the bottom of the riser through transfer line 26.

The oil charge to be cracked in the riser is, for example, a heavy gas oil having a boiling range of about 650° F. to about 100°F. (343°C. to 593°C.). The steam added to the riser can amount to about 10 weight percent based on the oil charge, but the amount of steam can vary widely. The catalyst employed is the catalyst composition defined above in a fluid form and is added to the bottom of the riser. The riser exit temperature range is suitably about 900°F. to about 1100°F. (482°C. to 593°C.) and is controlled by measuring the temperature of the product from the riser and then adjusting the opening of valve 40 by means of temperature controller 42 which regulates the inflow of hot regenerated catalyst to the bottom of riser 10. The temperature of the regenerated catalyst is above the control temperature in the riser so that the incoming catalyst contributes heat to the cracking reaction. The riser pressure is between about 10 and about 35 psig. Between about 0 and about 5 percent of the oil charge to the riser can be recycled. The residence time of both hydrocarbon and catalyst in the riser is very small and ranges from about 0.5 to about 5 seconds. The velocity through the riser is about 35 to about 55 feet per second and is sufficiently high so that there is little or no slippage between the hydrocarbon and the catalyst flowing through the riser. Therefore, no bed of catalyst is permitted to build up within the riser whereby the density within the riser is very low. The density within the riser is a maximum of about 4 pounds per cubic foot at the bottom of the riser and decreases to about 2 pounds per cubic foot at the top of the riser. Since no dense bed of catalyst is permitted to build up within the riser, the space velocity through the riser is unusually high and will have a range between about 100 or about 200 and about 600 weight of hydrocarbon per hour per instantaneous weight of catalyst in the reactor. No significant catalyst buildup within the reactor is permitted to occur, and the instantaneous catalyst inventory within the riser is due to a flowing catalyst to oil weight ratio between about 4:1 and about 5 1, the weight ratio corresponding to the feed ratio.

The hydrocarbon and catalyst exiting from the top of each riser is passed into a disengaging vessel 44. The top of the riser is capped at 46 so that discharge occurs through lateral slots 50 for proper dispersion. An instantaneous separation between hydrocarbon and catalyst occurs in the disengaging vessel. The hydrocarbon which separates from the catalyst is primarily gasoline together with some heavier components and some lighter gaseous components. The hydrocarbon effluent passes through cyclone system 54 to separate catalyst fines contained therein and is discharged to a fractionator through line 56. The catalyst separated from hydrocarbon in disengager 44 immediately drops below the outlets of the riser so that there is no catalyst level in the disengager but only in a lower stripper section 58. Steam is introduced into catalyst stripper section 58 through sparger 60 to remove any entrained hydrocarbon in the catalyst.

Catalyst leaving stripper 58 passes through transfer line 62 to a regenerator 64. This catalyst contains carbon deposits which tend to lower its cracking activity and as much carbon as possible must be burned from the surface of the catalyst. This burning is accomplished by introduction to the regenerator through line 66 of approximately the stoichiometrically required amount of air for combustion of the carbon deposits. The catalyst from the stripper enters the bottom section of the regenerator in a radial and downward direction through transfer line 62. Flue gas leaving the dense catalyst bed in regenerator 64 flows through cyclones 72 wherein catalyst fines are separated from flue gas permitting the flue gas to leave the regenerator through line 74 and pass through a turbine 76 before leaving for a waste heat boiler wherein any carbon monoxide contained in the flue gas is burned to carbon dioxide to accomplish heat recovery. Turbine 76 compresses atmospheric air in air compressor 78 and this air is charged to the bottom of the regenerator through line 66.

The temperature throughout the dense catalyst bed in the regenerator can range from about 1100°F. to 1400°F. (621°C. to 760°C.). The temperature of the flue gas leaving the top of the catalyst bed in the regenerator can rise due to afterburning of carbon monoxide to carbon dioxide. Approximately a stoichiometric amount of oxygen is charged to the regenerator, and the reason for this is to minimize afterburning of carbon monoxide to carbon dioxide above the catalyst bed to avoid injury to the equipment, since at the temperature of the regenerator flue gas some afterburning does occur. In order to prevent excessively high temperatures in the regenerator flue gas due to afterburning, the temperature of the regenerator flue gas is controlled by measuring the temperature of the flue gas entering the cyclones and then venting some of the pressurized air otherwise destined to be charged to the bottom of the regenerator through vent line 80 in response to this measurement. The regenerator reduces the carbon content of the catalyst from about 1±0.5 weight percent to about 0.2 weight percent or less. If required, steam is available through line 82 for cooling the regenerator.

Make-up catalyst is added to the bottom of the regenerator through line 84. Hopper 86 is disposed at the bottom of the regenerator for receiving regenerated catalyst to be passed to the bottom of the reactor riser through transfer line 26. While in FIG. 1 it has been shown that the novel catalyst composition herein can be introduced into the system as make-up by way of line 84, it is apparent that the catalyst composition, as make-up, or as fresh catalyst, in whole or in part, can be added to the system at any desirable or suitable point, for example, in line 26 or in line 14. Similarly, the components of the novel catalyst system need not be added together but can be added separately at any of the respective points defined above. The amount added will vary, of course, depending upon the charge stock used, the catalytic cracking conditions in force, the conditions of regeneration, the amount of metals present in the catalyst under equilibrium conditions, etc.

The relative amounts of the catalytically active and diluent components introduced into the system as make-up can be adjusted so as to increase the concentration of the diluent in the riser and in the system as the concentration of metal contaminants in the cracking zone increases. Accordingly, with the diluent acting as a scavenger for the metal contaminants, preventing such contaminants from reaching the cracking centers of the catalytically active component, the concentration of the diluent in the make-up catalyst can be adjusted so as to maintain a desired conversion, preferably a conversion of at least 55 percent. The concentration of the diluent component in the cracking zone can be adjusted so as to maintain a conversion of at least 55 percent when the cracking catalyst composite (cracking component plus diluent) contains combined nickel, vanadium and iron contaminant concentrations in the range of 4000 to 20,000 ppm total metals (based upon the weight of the catalyst composite). The diluent is particularly effective in the scavenging of vanadium. It may also be advantageous to include other known metals passivators to further reduce the deleterious effects of the metals contaminants. Examples would include antimony oxide or bismuth oxide, in addition to the magnesium and calcium/magnesium compounds.

The reaction temperature in accordance with the above described process is at least about 900°F. (482°C.). The upper limit can be about 1100°F. (593.3°C.) or more. The preferred temperature range is about 950°F. to about 1050°F. (510°C. to 565.6°C.). The reaction total pressure can vary widely and can be, for example, about 5 to about 50 psig (0.34 to 3.4 atmospheres), or preferably, about 20 to about 30 psig (1.36 to 2.04 atmospheres). The maximum residence time is about 5 seconds, and for most charge stocks the residence time will be about 1.0 to about 2.5 seconds or less. For high molecular weight charge stocks, which are rich in aromatics, residence times of about 0.5 to about 1.5 seconds are suitable in order to crack mono- and di-aromatics and naphthenes which are the aromatics which crack most easily and which produce the highest gasoline yield, but to terminate the operation before appreciable cracking of polyaromatics occurs because these materials produce high yields of coke and $C_2$ and lighter gases. The length to diameter ratio of the reactor can vary widely, but the reactor should be elongated to provide a high linear velocity, such as about 25 to about 75 feet per second; and to this end a length to diameter ratio above about 20 to about 25 is suitable. The reactor can have a uniform diameter or can be provided with a continuous taper or a stepwise increase in diameter along the reaction path to maintain a nearly constant velocity along the flow path.

The amount of diluent can vary depending upon the ratio of hydrocarbon to diluent desired for control purposes. If steam is the diluent employed, a typical amount to be charged can be 1-10 percent by weight, based on hydrocarbon charge. A suitable but non-limiting proportion of diluent gas, such as steam or nitrogen, to fresh hydrocarbon feed can be about 0.5 to about 10 percent by weight.

The catalyst particle size (of each of the two components, that is, of the catalytically-active component and of the diluent) must render it capable of fluidization as a disperse phase in the reactor. Typical and non-limiting fluid catalyst particle size characteristics are as follows:

| Size (Microns) | 0-20 | 20-45 | 45-75 | >75 |
|---|---|---|---|---|
| Weight Percent | 0-5 | 20-30 | 35-55 | 20-40 |

These particle sizes are usual and are not peculiar to this invention. A suitable weight ratio of catalyst to total oil charge is about 4:1 to about 25:1, preferably about 6:1 to about 10:1. The fresh hydrocarbon feed is generally preheated to a temperature of about 600°F. to about 700°F. (316°C. to 371°C.) but is generally not vaporized during preheat and the additional heat required to achieve the desired reactor temperature is imparted by hot, regenerated catalyst.

The weight ratio of catalyst to hydrocarbon in the feed is varied to affect variations in reactor temperature. Furthermore, the higher the temperature of the regenerated catalyst, the less catalyst is required to achieve a given reaction temperature. Therefore, a high regenerated catalyst temperature will permit the very low reactor density level set forth below and thereby help to avoid backmixing in the reactor. Generally catalyst regeneration can occur at an elevated temperature of about 1250°F. (676.6°C.) or more. Carbon-on-catalyst of the regenerated catalyst is reduced from about 0.6 to about 1.5, to a level of about 0.3 percent by weight. At usual catalyst to oil ratios, the quantity of catalyst is more than ample to achieve the desired catalytic effect and therefore if the temperature of the catalyst is high, the ratio can be safely decreased without impairing conversion. Since zeolitic catalysts, for example, are particularly sensitive to the carbon level on the catalyst, regeneration advantageously occurs at elevated temperatures in order to lower the carbon level on the catalyst to the stated range or lower. Moreover, since a prime function of the catalyst is to contribute heat to the reactor, for any given desired reactor temperature the higher the temperature of the catalyst charge, the less catalyst is required. The lower the catalyst charge rate, the lower the density of the material in the reactor. As stated, low reactor densities help to avoid backmixing.

The reactor linear velocity while not being so high that it induces turbulence and excessive backmixing, must be sufficiently high that substantially no catalyst accumulation or buildup occurs in the reactor because such accumulation itself leads to backmixing. (Therefore, the catalyst to oil weight ratio at any position throughout the reactor is about the same as the catalyst to oil weight ratio in the charge.) Stated another way, catalyst and hydrocarbon at any linear position along the reaction path both flow concurrently at about the same linear velocity. A buildup of catalyst in the reactor leads to a dense bed and backmixing, which in turn increases the residence time in the reactor, for at least a portion of the charge hydrocarbon induces aftercracking. Avoiding a catalyst buildup in the reactor results in a very low catalyst inventory in the reactor, which in turn results in a high space velocity. Therefore, a space velocity of over 100 to 200 weight of hydrocarbon per hour per weight of catalyst is highly desirable. The space velocity should not be below about 35 and can be as high as about 500. Due to the low catalyst inventory and low charge ratio of catalyst to hydrocarbon, the density of the material at the inlet of the reactor in the zone where the feed is charged can be only about 1 to less than 5 pounds per cubic foot, although these ranges are non-limiting. An inlet density in the zone where the low molecular weight feed and catalyst is charged below about 4 pounds per cubic foot is desirable since this density range is too low to encompass dense bed systems which induce backmixing. Although conversion falls off with a decrease in inlet density to very low levels, it has been found the extent of aftercracking to be a more limiting feature than total conversion of fresh feed even at an inlet density of less than about 4 pounds per cubic foot. At the outlet of the reactor the density will be about half of the density at the inlet because the cracking operation produces about a four-fold increase in moles of hydrocarbon. The decrease in density through the reactor can be a measure of conversion.

The above conditions and description of operation are for the preferred fluid bed riser cracking operation. For cracking in the older conventional fluid bed operation or in a fixed-bed operation, the particular reaction conditions are well known in the art.

EXAMPLES

Additive A—Sepiolite Additive

A comparative additive (Additive A), prepared by the Ketgen Corp. was prepared composed of 80 Wt % Spanish sepiolite in 20 Wt % proprietary binder in a manner similar to Additive B.

Additive B—Preparation of Dolomite/Sepiolite Additives

A calcium/magnesium-containing material useful for this invention was prepared using an aluminum hydroxy oligomer as the binding agent. 80 g of a 50 Wt % aqueous solution of aluminum chlor-hydroxy (Reheis Chemical) was dispersed in 500 ml of deionized water. To this was added 160 g (dry basis) of crushed Spanish sepiolite (Tolsa) with high shear, followed by 200 g crushed dolomite again with high shear. The mixture thickened and was diluted back to about 36% solids by the addition of 150 ml of addition water, and allowed to stir for two hours at ambient conditions. The resultant slurry was then converted to microspheroidal form using a laboratory sized spray-drier (Yamato). The powder was dried at 250°F. in a vacuum oven, and then reslurried in one liter of 20% ammonium hydroxide solution for 15 minutes at 80°C. The slurry was filtered and the process repeated. Resultant filter cake was further water washed and dried at 250°F., and subsequently calcined at 1000°F. The material was lightly crushed to break up aggregates and sieved to 100/325 mesh, and designated Additive B. A similar batch of material was reproduced as Additive B'. These additives were 50% dolomite, 40% sepiolite, and 10% binder, and on an oxide basis contained about 29 wt. % calcium, 29 wt. % magnesium, and 32 wt. % silicon.

Additive I—Preparation of Dolomite/Kaolin Additive

Additive I was prepared using the method of Additive B, with sepiolite replaced by kaolin. Additive I was 50 wt. % dolomite, 40 wt. % kaolin, and 10 wt. % binder. Kaolin is a naturally-occurring hydrous aluminosilicate frequently used as a economic diluent and matrix component in FCC catalysts.

CATALYSTS

A number of catalyst systems containing the claimed additive are described to demonstrate utility for vanadium passivation. The catalyst inventory of each test catalyst system contained a mixture of commercial catalyst particles (designated catalyst 1, 2, etc.) along with discrete, vanadium passivation particles (designated as additive A, B, B', or I). Each of the catalyst systems is accordingly identified by a label that corresponds to the host commercial catalyst together with the test additive, e.g. 1A, 1B, etc. Each system performance was compared to its respective, non-diluted commercial catalyst component.

Catalyst 1

Reference Catalyst 1 was DXB-150 (Davison Chemical Co.), a commercial FCC catalyst containing a partially rare earth stabilized zeolite in a modified silica sol matrix having about 35 wt. % total alumina (zeolite) content.

Catalysts 1A, 1B, 1B', and 1I

Admixtures of 80 Wt % of DXB-150 (Catalyst 1) intimately blended with 20% of the additives A, B, B', and I were prepared. These catalysts are designated 1A, 1B and 1B', and 1I, respectively.

Each catalyst admixture was heat shocked by placing in a preheated oven at 1100°F. (593°C.) for one hour. Then the catalysts were poisoned with 5000 ppm of vanadium by impregnation with vanadium naphthanates, followed by calcination at 1000°F. (538°C.) for 10 hours. The resulting catalyst was steam treated at 1450°F. (788°C.) with 95% steam and 5% nitrogen for 5 hours.

Catalysts 2, 2A and 2B

The reference catalyst (Commercial Catalyst 2) used in this test was OCTACAT D, an octane-enhancing cracking catalyst containing an ultra-stabilized hydrogen "Y" zeolite in an alumina sol generated matrix. OCTACAT D is sold by Davison Chemical Co.

Catalysts 2A and 2B are 80:20 blends of this reference catalyst with sepiolite and with dolomite/sepiolite, additives A and B, respectively.

Test Procedure L

Catalyst samples 1, 1A, 1B, 1B', and 1I were tested in a micro-activity test at 960°F. (516°C.) reaction temperature, 32 weight hourly space velocity (WHSV), 37 seconds contact time, and a catalyst to oil ratio of 3.,0 with 4.0 grams of catalyst. The charge stock was a gas-oil having a boiling range as characterized in Table I below.

TABLE I

| GAS OIL INSPECTIONS | |
|---|---|
| Stock Identification | Feedstock No. 1 |
| Inspections: | |
| Gravity | 23.5 |
| Pour Point, API | 85 |
| Nitrogen, Wt. % | 0.16 |
| Basic Nitrogen, ppm | 311 |
| Sulfur, Wt. % | 0.17 |
| RAM Carbon | 0.3 |
| Aniline Point, °F. | 181.5 |
| Nickel, ppm | 0.7 |
| Vanadium, ppm | 0.23 |
| Distillation, GC Sim Dist. | |
| 10 Pct. Cond. | 626 |
| 30 Pct. Cond. | 738 |
| 50 Pct. Cond. | 803 |
| 70 Pct. Cond. | 869 |
| 90 Pct. Cond. | 977 |
| EP | 1052 |

The results obtained for the reference catalyst and each catalyst poisoned with 5000 ppm of vanadium are presented below in Table II. Feed conversion was either maintained or improved, with betterment in yield structure, i.e., increased gasoline yield and, decreased coke and hydrogen make for the cases where the commercial catalyst was diluted with 20% vanadium trap, which are catalytically inert particles. Moreover the Catalysts 1B and 1B', where the sepiolite was combined with dolomite gave particularly significant improvements (27% increase in kinetic activity with additional selectivity gains) gave particularly significant improvements. When dolomite was dispersed in kaolin, rather than sepiolite, the performance was substantially inferior. Thus the combination of dolomite with sepiolite gives superior vanadium passivation to either dolomite or sepiolite employed as a separate entity.

TABLE II

| | Catalytic Cracking of Feed 1 [1] | | | | |
|---|---|---|---|---|---|
| Catalyst | Commercial Catalyst 1 | 1A | 1B | 1B' | 1I |
| Additive | None | A | B | B' | I |
| Vanadium, ppm: | | | 5000 | | |
| Conversion, Wt % | 49 | 50 | 55 | 55 | 41 |
| Kinetic Act. | 0.96 | 1.0 | 1.22 | 1.22 | 0.70 |
| Relative Act. | 1.0 | 1.04 | 1.27 | 1.27 | 0.72 |
| Yields, Wt % | | | | | |
| C5-430 | 37 | 38 | 43 | 43 | 34 |
| Carbon | 4.0 | 3.5 | 3.2 | 2.9 | 2.0 |
| Hydrogen | 0.53 | 0.44 | 0.24 | 0.23 | 0.18 |
| Selectivity [2] | | | | | |
| C5-430 | 0.76 | 0.76 | 0.78 | 0.77 | 0.82 |
| Carbon | 0.081 | 0.071 | 0.058 | 0.052 | 0.049 |
| Hydrogen | 0.0109 | 0.0088 | 0.0044 | 0.0041 | 0.0044 |

[1] Using test procedure L
[2] Per Unit of Conversion.

Test Procedure M

Vanadium impregnation coupled with high temperature steam deactivation, as in Test Procedure L is a particularly rigorous screening for vanadium passivation. However, it is a "worst case" scenario since it tends to cause most of the vanadium present to become reactive. In practice, it is believed that only a portion of the vanadium contaminant is an active poison. Accordingly, catalyst mixtures were tested under conditions that provide a better simulation of commercial practice.

Test Procedure M steam deactivates the test catalyst inventory (1450°F., 5 hours) prior to contacting with a vanadium contamination feed in a fixed-fluidized bed, cyclic reactor (FFBC). This evaluation technique permits the catalyst inventory to age and equilibrate in a repetitive cyclic environment consisting of: cracking (930°F.), steam-stripping (900°F.), and regeneration (1400°F.). The aging took place over 70 cycles, during which vanadium was deposited on the catalyst by doping the feedstock with an appropriate amount of vanadium naphthanate at a catalyst to oil ratio of 15. Vanadium-on-catalyst was ascertained by subsequent analysis (X-ray fluorescence). Catalysts poisoned in this manner were then evaluated by the micro-activity test described in Test Procedure L. In this particular instance the gas-oil described in Table III was employed.

Catalytic evaluations of the vanadium contaminated catalysts 2, 2A and 2B using Test Procedure M are tabulated in Table IV below. Vanadium-on-cat levels were close to, or exceeded, the target of 4000 ppm. Under these test conditions Reference catalyst 2 was severely deactivated relative to vanadium free catalyst. However, Catalyst 2B showed a 20% higher relative activity than the reference catalyst, even though the net zeolite content was diluted by 20%. Moreover this was achieved at a higher level of vanadium, 4700 ppm versus 3800 ppm. Improved selectivity i.e., increased gasoline yield and, decreased carbon and hydrogen were likewise noted.

TABLE III

| GAS OIL INSPECTIONS | |
|---|---|
| Stock Identification | Feedstock No. 2 |
| Inspections: | |
| Gravity | 24.3 |
| Nitrogen, Wt. % | 0.10 |
| Basic Nitrogen, ppm | 210 |
| Sulfur, Wt. % | 0.33 |
| RAM Carbon | 0.17 |
| Aniline Point, °F. | 185.8 |
| Distillation, D 1160 Dist. | |
| 10 Pct. Cond. | 703 |
| 30 Pct. Cond. | 795 |
| 50 Pct. Cond. | 872 |
| 70 Pct. Cond. | 961 |
| 90 Pct. Cond. | 1098 |
| EP | 1256 |

Portions of the spent catalysts containing sepiolite or dolomite/sepiolite vanadium traps were examined by a scanning electron microprobe to determine metal profiles across catalyst particles. As indicated in Table IV, the dolomite/sepiolite additive contained in Catalyst 2B exhibited a 30:1 ratio for vanadium scavenging (Additive:Host) as compared to 3:1 for the sepiolite additive in Catalyst 2A. This greatly enhanced specificity for vanadium, vis-a-vis the commercial catalyst with or without a sepiolite additive is further evidence of the effectiveness of the instant sepiolite/dolomite additives.

TABLE IV

| Catalyst | 2 | 2A | 2B |
|---|---|---|---|
| Additive | None | A | B |
| V, 70 Cycles[(1)] | 0.38% | 0.37% | 0.47% |
| MAT Conv., Wt %: | 43 | 41* | 48* |
| Rel. Activity | 1.0 | 0.9 | 1.2 |

TABLE IV-continued

| Catalyst | 2 | 2A | 2B |
|---|---|---|---|
| Yield, Wt %: | | | |
| C5-430 | 33 | 31 | 37 |
| LCO | 18 | 18 | 18 |
| Coke | 3.4 | 3.2 | 2.4 |
| H2 | 0.43 | 0.47 | 0.15 |
| V-Specificity | | 3:1 | 30:1 |

Additive:
[(1)]Using the Feed 1
**MAT: 960° F., 32 WHSV, 3 Cat/Oil, Feed 2

Test Procedure N

In FCC processing, a small portion of feedstock sulfur becomes entrained in catalytic coke and is eventually converted to sulfur oxides ($SO_2$, $SO_3$) under conditions of catalyst regeneration. Calcium and magnesium oxides such as might be derived from the decomposition of dolomite or their respective carbonates are among those materials that are sometimes used to selectively scavenge $SO_3$ off-gases. Thus it might be expected that competition from $SO_x$ pickup might diminish vanadium passivation.

Performance data from the previous Examples were obtained using a low sulfur gas-oil (0.17 Wt %). Therefore in order to determine the sulfur tolerance of the dolomite/sepiolite vanadium trap, a test was made using a different feed containing 0.82 Wt % sulfur. The feed was prepared by diluting Feed III containing sulfur (Table V) with a 50:50 wt. % decalin/hexadecane mixture to ensure flowability.

TABLE V

| GAS OIL INSPECTIONS | |
|---|---|
| Stock Identification | Feedstock No. 3 |
| Inspections: | |
| Gravity | 15.6 |
| Pour Point, API | 90 |
| Nitrogen, Wt. % | 0.54 |
| Sulfur, Wt. % | 0.965 |
| RAM Carbon | 0.6 |
| Aniline Point, °F. | 142.8 |
| Nickel, ppm | 1.8 |
| Vanadium, ppm | 1.6 |
| Distillation, D 1160 Dist. | |
| 10 Pct. Cond. | 757 |
| 30 Pct. Cond. | 838 |
| 50 Pct. Cond. | 900 |
| 70 Pct. Cond. | 964 |
| 90 Pct. Cond. | 1080 |
| EP | 1216 |

Catalyst 2C and Additive C

The comparison involved Reference Catalyst 2, Catalyst 2B and Catalyst 2C. Catalyst 2C is an 80:20 dilution of OCTACAT D with a passivation agent made in a manner similar to Additive B, excepting that the dolomite and sepiolite raw materials were both micronized before formulation, and were not treated with ammonium hydroxide. This additive is designated Additive C.

TABLE VI

| | High Sulfur Feed[(1)] | | |
|---|---|---|---|
| Catalyst | Reference 2 | Catalyst 2B | Catalyst 2C |
| V WT %: (70° Cycles)* | — | 0.34 | — 0.34 | 0.35** |

TABLE VI-continued

High Sulfur Feed[(1)]

| Catalyst | Reference 2 | | Catalyst 2B | | Catalyst 2C |
|---|---|---|---|---|---|
| MAT Conv. Wt % | 59 | 48 | 54 | 53 | 52 |
| Activity | 1.45 | 0.92 | 1.16 | 1.13 | 1.07 |
| Rel. Act. | 1.00 | 0.63 | 0.80 | 0.78 | 0.74 |
| Yield, Wt %: | | | | | |
| C5-430 | 45 | 35 | 42 | 41 | 40 |
| Coke | 2.52 | 3.73 | 2.07 | 2.59 | 2.33 |
| H2 | 0.07 | 0.56 | 0.06 | 0.32 | 0.29 |
| Selectivity: | | | | | |
| C5-430 | 0.76 | 0.73 | 0.77 | 0.77 | 0.77 |
| Coke | 0.043 | 0.078 | 0.038 | 0.049 | 0.045 |
| H2 | 0.0012 | 0.0117 | 0.0011 | 0.0061 | 0.0056 |

[(1)]V Deposition Feed Contains 0.82% Sulfur.
**Separate Batch of Raw Material.

Inspection of the data presented in Table VI shows that high feed sulfur does not affect passivation performance. The same trends that were evident using Test Procedure M were confirmed. At 3400 ppm vanadium contamination, the reference catalyst (Catalyst 2) retained only 63% of its original activity, whereas the catalysts with the additive of this invention retained better than 93% (Relative Activity 0.80→0.78 and 0.74). Improved yield structure was also maintained relative to the vanadium contaminated reference.

Test Procedure O

To test for sulfur tolerance under even more severe conditions, a Catalyst 2B was deliberately saturated with sulfur and then evaluated for vanadium passivation. Specifically, 0.25 wt. % of a CO promoter was added to Catalysts 2 and 2B and these mixtures were fluidized at 1250°F. for 6 hours with a gas stream composed of 1% $SO_2$ in air. After 4 hours, the $SO_2$ was observed to have "broken through", i.e. $SO_2$ was observed in the outlet gas. Catalysts 2 and 2B were then further equilibrated for an additional 100 cycles at 1250°F. with the 0.82% sulfur feed in the absence of of vanadium. After equilibration sulfur-on-catalyst was low, indicating that, although about ⅓ of the divalent ions might be associated with $SO_4^{--}$, the sulfation is believed to be reversible.

TABLE VII

| Catalyst | Reference 2 | Catalyst 2B |
|---|---|---|
| Equilibration Cycles | 100 | 100 |
| Vanadium Cycles | 70 | 70 |
| Vanadium, ppm | 3600 | 3900 |
| Conversion, Wt % | 49 | 51 |
| Kinetic Activity | 0.98 | 1.02 |
| Relative Activity | 1.00 | 1.04 |
| Yield, Wt % | | |
| C5-430 | 36 | 38 |
| Carbon | 3.5 | 2.5 |
| Hydrogen | 0.48 | 0.22 |

TABLE VII-continued

| Catalyst | Reference 2 | Catalyst 2B |
|---|---|---|
| Selectivity* | | |
| C5-430 | 0.73 | 0.76 |
| Carbon | 0.072 | 0.049 |
| Hydrogen | 0.0097 | 0.0045 |
| Hydrogen/CH4 | 1.21 | 0.78 |

*Per Unit of Conversion

The catalysts were then subsequently poisoned with the same vanadium spiked feed over 70 further cycles at conditions of the previous Examples. Results are displayed in Table VII above. Actual vanadium levels closely approached the desired range.

The data indicates that the reference catalyst was relatively immune to sulfur but exhibited essentially the same loss of activity on contact with vanadium as in the earlier example. The protected catalyst retained almost all of the earlier demonstrated passivation effect in spite of the fact that it contains known sulfur getters. Conversion was down slightly, but still better than the reference catalyst even though there is a 20% dilution in net zeolite content. Moreover the significant reductions in coke- and hydrogen make are still very evident, along with the increased selectivity to gasoline. Thus the data strongly supports the conclusion that sulfur does not significantly interfere with passivation performance.

Additives 1D, 1E, 1F and 1G

The vanadium trap that has been described thus far consists of 50% dolomite dispersed in a sepiolite matrix using a 10% binder Additional studies were carried out where the impact of varying the dolomite to sepiolite ratio on vanadium passivation was measured. Additives were formulated and spray-dried according to the procedure of Example B. The dolomite:sepiolite ratio was varied from 0:60 Wt:Wt % in 10% increments to a 70:20 ratio, all with 10% binder. The additives were then blended with the commercial cracking catalyst, Catalyst 1, at a 20% dilution.

The resultant catalysts are listed in Table VIII. Each of the formulations was MAT evaluated with and without a 5000 ppm vanadium doping (incipient wetness technique) following a 1450 F. steam deactivation. Conversion data, kinetic activities, and activity relative to the undiluted reference catalyst are also presented. Inspection of the table reveals that catalysts containing the dolomite/sepiolite additives have similar fresh Conversions (activities), albeit they do represent a dilution of the host catalyst's metal-free activity. However, at 5000 ppm vanadium, all of the catalyst containing dolomite/sepiolite are more active than the reference per se, and all retain a significantly higher, reasonably uniform portion of their initial activity. Hence within the ratios of dolomite:sepiolite studied, catalyst activity and vanadium poisoning is not a problem.

TABLE VIII

| Catalyst | Reference 1 | 1D | 1E | 1B | 1F | 1G |
|---|---|---|---|---|---|---|
| Additive: | None | D | E | B | F | G |
| Dolomite % | 0 | 30 | 40 | 50 | 60 | 70 |
| Sepiolite % | 0 | 60 | 50 | 40 | 30 | 20 |
| Binder % | 0 | 10 | 10 | 10 | 10 | 10 |
| Fresh Steamed Deactivation (Zero Vanadium): | | | | | | |
| Conversion, St % | 66 | 59 | 61 | 58 | 60 | 59 |
| Kinetic Activity | 1.97 | 1.41 | 1.59 | 1.46 | 1.47 | 1.42 |
| Steam Deactivation with 5000 ppm Vanadium: | | | | | | |
| Conversion, Wt % | 49 | 53 | 55 | 55 | 55 | 53 |
| Kinetic Activity | 0.94 | 1.12 | 1.12 | 1.22 | 1.22 | 1.13 |

TABLE VIII-continued

| Catalyst | Reference 1 | 1D | 1E | 1B | 1F | 1G |
|---|---|---|---|---|---|---|
| Relative Activity (2) | 0.48 | 0.79 | 0.77 | 0.85 | 0.83 | 0.80 |
| Selectivity (1) | | | | | | |
| C5-430 | 0.76 | 0.78 | 0.78 | 0.78 | 0.78 | 0.79 |
| Carbon | 0.084 | 0.056 | 0.53 | 0.052 | 0.053 | 0.052 |
| Hydrogen | 0.0107 | 0.0036 | 0.0034 | 0.004 | 0.0039 | 0.0044 |
| Hydrogen/CH4 | 1.51 | 0.67 | 0.66 | 0.71 | 0.72 | 0.55 |

(1) Per unit conversion
(2) Kinetic activity at 5000 ppm V ÷ kinetic activity at 0 ppm V.

Table VIII also illustrates the impact of changing the dolomite sepiolite ratio on the physical properties of the additive combinations. The data reported is for microspheres which have all been calcined, but not steamed. As the dolomite content of the additive increases from 30 to 70%, there is a linear decrease in surface area, which accompanied by a corresponding non-linear increase in apparent bulk density. Likewise over the same range studied, pore volume declines at higher dolomite content, but the mean pore diameter changes very little.

This data has important implications in terms of manufacturing flexibility. Dolomite is an inexpensive, ubiquitous, abundant mineral, hence if used at higher loadings it can opportunely affect additive manufacturing cost. Enhanced dolomite content also improves particle average bulk densitY (ABD) which is important for additive retention and fluidization in an operating FCC unit. It needs be mentioned that this data was obtained using a small laboratory sized spray dryer. Commercial experience indicates that with the higher drying temperatures and longer residence times available in commercial dryers, particles with further improvements in particle integrity are likely to be realized. Thus, in summary, the dolomite:sepiolite ratio can be manipulated over the range studied for cost or physical property enhancement without impeding catalytic or vanadium passivation activity.

EXAMPLE 1—Variation of Additive Content

Because of its high efficiency for scavenging vanadium, the instant invention can be utilized at reasonably low levels in terms of percent of catalyst inventory. This is illustrated in Table IX. Commercial Catalyst 1 was again employed as the active host catalyst and was diluted/blended with Additive B at levels ranging from 2 to 20%. Portions of these blends were steam deactivated at 1450 F. and MAT evaluated under conditions previously stated. The remaining materials were each poisoned with 5000 ppm vanadium (incipient wetness), steam deactivated, and also MAT evaluated (per Test Procedure L).

The data in Table IX for the fresh, steam deactivated catalysts in the absence of vanadium show the expected decline in activity as a function of dilution level, since the dolomite:sepiolite in its own right has negligible cracking activity. On the other hand, at 5000 ppm vanadium, the presence of as little as 2% additive B begins to impart some vanadium tolerance, i.e., relative activity retention approaches 60% as compared to 50% for the unprotected commercial catalyst. This is accompanied with attendant improvements in yield—enhanced gasoline yields, and a drop in carbon and hydrogen production. Activity and yield improvements continue until above 5% whereupon they tend to line out.

This ability to maintain unit performance at low levels of addition allows the passivation agent to become more cost effective. Thus, when used in conjunction with conventional cracking catalysts, a smaller loss of front end catalyst activity is expected than would be encountered with previous passivation technologies.

TABLE IX

| | Fresh, Steam Deactivated Catalyst | | | | | | |
|---|---|---|---|---|---|---|---|
| Catalyst 1: | | | | | | | |
| Wt % | 100 | 96 | 95 | 92.5 | 90 | 85 | 80 |
| Additive B Wt % | 0 | 2 | 5 | 7.5 | 10 | 15 | 20 |
| MAT Conv. WT %: | 65 | 64 | 63 | 62 | 60 | 60 | 59 |
| Activity:* | 1.84 | 1.79 | 1.70 | 1.65 | 1.49 | 1.51 | 1.46 |
| | 5000 ppm V | | | | | | |
| MAT Conv. WT % | 49 | 51 | 55 | 55 | 52 | 53 | 55 |
| Activity | 0.94 | 1.06 | 1.23 | 1.21 | 1.09 | 1.13 | 1.2 |
| Relative Activity(1) | 0.51 | 0.59 | 0.72 | 0.73 | 0.73 | 0.75 | 0.85 |
| C5-430 | 37 | 40 | 43 | 43 | 41 | 42 | 43 |
| H2: | 0.52 | 0.33 | 0.30 | 0.25 | 0.24 | 0.23 | 0.23 |
| Coke: | 4.1 | 3.4 | 3.1 | 3.1 | 2.8 | 3.0 | 2.9 |
| $H_2/CH_4$ | 1.52 | 1.0 | 0.83 | 0.86 | 0.78 | 0.73 | 0.66 |

(1) Kinetic activity at 5000 ppm V/kinetic activity at 0 ppm V.

TEST PROCEDURE P

Additive content data has also been obtained with catalysts that have been FFBC aged in the presence of vanadium in order to examine them with a truer simulation of the FCC process (4000 ppm vanadium, 50 cycles, 1030 F. reactor, 1400 regenerator). The catalysts were formulated by diluting a Catalyst 3, very high zeolite containing microspheroidal material, to a net 35% ultra-stable "Y" content, using as diluents various amounts of dolomite:sepiolite Additive 1B" augmented with a third additive, which was an inert material having little passivation ability. Each of the component materials was individually steam deactivated at 1450 F., prior to blending. The particular batch of dolomite:sepiolite used was additive H, made by a larger scale preparation of Additive B.

The results are listed in Table X. As level of addition of the passivating agent is increased, there is a corresponding increase in conversion and kinetic activity compared to the unprotected reference catalyst. Gasoline yield also rises, whereas coke and hydrogen production, and hydrogen to CH4 ratios decline indicating that vanadium's secondary dehydrogenation activity is being mitigated.

A general overall increase in conversion was noted in these tests when comparing the host catalyst and catalyst systems containing the additive (as compared to the earlier example with impregnated vanadium). One of the reasons is that the fresh catalyst activity also increases. In terms of preservation of initial activity, the passivated catalysts average about 85%, while the host catalyst retains 77%. The reason for the more subtle effects observed in this cyclic deposition series, is that only part of the vanadium participates in the vapor transfer poisoning mechanism. Thus these data better mimic actual commercial practice. Vanadium deposition by the incipient wetness and subsequent steaming tends to exaggerate the vapor transfer effect, causing more substantial catalyst deactivation than would actually be experienced.

TABLE X

| Catalyst 3, Wt % (plus inerts) | 100 | 97 | 95 | 90 | 80 |
|---|---|---|---|---|---|
| Additive H, % | 0 | 3 | 5 | 10 | 20 |
| Vanadium, ppm | | | 4000* | | |
| Conversion, Wt % | 43 | 45 | 45 | 47 | 50 |
| Activity | 0.76 | 0.84 | 0.81 | 0.88 | 1.01 |
| Yield: | | | | | |
| C5-430 | 32 | 35 | 34 | 36 | 39 |
| Carbon | 3.7 | 3.7 | 3.4 | 3.1 | 2.8 |
| Hydrogen | 0.60 | 0.53 | 0.48 | 0.41 | 0.28 |
| Selectivity:** | | | | | |
| C5-430 | 0.76 | 0.76 | 0.77 | 0.77 | 0.78 |
| Carbon | 0.0875 | 0.0825 | 0.0756 | 0.0665 | 0.0551 |
| Hydrogen | 0.0140 | 0.0117 | 0.0107 | 0.0089 | 0.0056 |
| Hydrogen/CH4 | 1.23 | 1.11 | 1.03 | 0.89 | 0.65 |

*Vanadium is reported at nominal value, actual vanadium-on-cat data not yet available.
**Per Unit of conversion.

ADDITIVE G

Sepiolite, a principal component of the instant invention, is a hydrous, crystalline magnesium silicate classified as a member of the palygorskite family of minerals. Attapulgite also belongs to this mineral class. It is similar to sepiolite in its mineralogical attributes, but differs in unit cell size and ultimate particle dimensions. Frequently attapulgite samples show partial replacement of magnesium by some aluminum or iron. Quality deposits of attapulgite in commercial quantities are indigenous to the United States (Georgia) and are available at lower cost than sepiolite. Consequently, an additive formulation was evaluated wherein attapulgite was substituted for sepiolite.

Additive G was formulated (50% dolomite/40% attapulgite/10% binder) according to the recipe for Additive B using a commercial grade of attapulgite (Diluex FG, Floridin Co.) as a replacement for sepiolite. Three catalysts were formulated to the same 35% ultra-stable "Y" zeolite content using the same materials and procedures as described to make Catalyst 3B. Catalyst 3 has no vanadium trap and serves as the reference catalyst. Catalyst 3H contains dolomite/sepiolite (Additive H), and catalyst 3G contains the dolomite/attapulgite particles, (Additives G), each at the 20 Wt % level.

The catalysts were each tested at three different vanadium levels deposited over 50 cycles using the FFBC aging conditions cited in the Test Procedure M, Feed 1. A 50 cycle reference point in the absence of vanadium was also obtained. Pertinent results are listed in Table XI.

TABLE XI

| Catalyst | 3 | | | |
|---|---|---|---|---|
| Additive | None | | | |
| Vanadium, ppm* | 0 | 1000 | 3000 | 4000 |
| Conversion, Wt % | 49 | 51 | 45 | 43 |
| Activity | 0.98 | 1.03 | 0.82 | 0.76 |
| Selectivity:** | | | | |
| C5-430 | 0.79 | 0.77 | 0.77 | 0.76 |
| Coke | 0.0348 | 0.0579 | 0.0760 | 0.0875 |
| Hydrogen | 0.0020 | 0.0062 | 0.0113 | 0.0140 |
| Hydrogen/CH4 | 0.27 | 0.70 | 1.08 | 1.23 |
| Catalyst | H | | | |
| Additive | 20 Wt % "H" {50% dolomite/40% sepiolite/10% binder} | | | |
| Vanadium, ppm* | 0 | 1000 | 3000 | 4000 |
| Conversion, Wt % | 51 | 49 | 50 | 50 |
| Activity | 1.04 | 0.94 | 1.02 | 1.01 |
| Selectivity:** | | | | |
| C5-430 | 0.78 | 0.78 | 0.78 | 0.78 |
| Coke | 0.0407 | 0.0435 | 0.0495 | 0.0551 |
| Hydrogen | 0.0018 | 0.0038 | 0.0050 | 0.0056 |
| Hydrogen/CH4 | 0.24 | 0.46 | 0.60 | 0.65 |
| Catalyst | 3G | | | |
| Additive | 20 Wt % "G" {50% dolomite/40% attapulgite/10% binder} | | | |
| Vanadium, ppm* | 0 | 1000 | 3000 | 4000 |
| Conversion, Wt % | 49 | 51 | 49 | 48 |
| Activity | 0.97 | 1.03 | 0.95 | 0.92 |
| Selectivity:** | | | | |
| C5-430 | 0.79 | 0.79 | 0.79 | 0.79 |
| Coke | 0.0375 | 0.0382 | 0.0445 | 0.0511 |
| Hydrogen | 0.0016 | 0.0029 | 0.0042 | 0.0048 |
| Hydrogen/CH4 | 0.31 | 0.39 | 0.52 | 0.55 |

*Nominal values, actual vanadium-on-cat currently not available.
**Per Unit of Conversion.

Catalyst 3, the unprotected catalyst, shows a rapid fall off in conversion and selectivity as vanadium levels increase. Catalysts 3H and 3G, on the other hand, exhibit very little conversion or gasoline loss over the same range, and increases in coke and hydrogen make are very much lower. Of equal importance, is the fact that the data for Catalysts 3H and 3G which are very similar, show that sepiolite and attapulgite in combination with dolomite both give good performance.

What is claimed is:

1. A dual component catalyst composition for the catalystic cracking of metal-containing hydrocarbonaceous feedstock comprises:
   (1) A first component comprising an active cracking catalyst; and
   (2) A second component, as a separate and distinct entity, said second component comprising the following materials.
      (a) A calcium and magnesium containing material selected from the group consisting of dolomite, substantially amorphous calcium magnesium silicate, calcium magnesium oxide, calcium magnesium acetate, calcium magnesium carbonate, and calcium magnesium subcarbonate;
      (b) A magnesium containing material comprising a hydrous magnesium silicate; and
      (c) A binder selected from the group consisting of kaolin, bentonite, montmorillonite, saponite, hectorite, alumina, silica, titania, zirconia, silica-alumina, and combinations thereof;
   wherein the weight ratio of material (a) to material (b) is from about 80:20 to about 20:80 and said binder comprises from about 5 to 30% by weight of said second component based on the total weight of said second component; wherein said material (a) substantially transforms under cracking conditions to active compounds for metal trapping.

2. The composition as claimed in claim 1, wherein said material (a) comprises dolomite.

3. The composition as claimed in claim 1, wherein said hydrous magnesium silicate comprises material selected from the group consisting of sepiolite, attapolgite, palygorskite, saponite, talc, and amorphous synthetic sepiolite.

4. The composition as claimed in claim 3, wherein said material comprises sepiolite.

5. The composition as claimed in claim 4, wherein said sepiolite comprises Spanish sepiolite.

6. The composition as claimed in claim 3, wherein said material comprises attapulgite.

7. The composition as claimed in claim 1, wherein said ratio is from about 50:50 to about 70:30.

8. The composition as claimed in claim 1, wherein said cracking catalyst comprises a zeolite.

9. The composition as claimed in claim 8, wherein said zeolite comprises zeolite or zeolites selected from the group consisting of gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, zeolites X, Y, A, L, ZK-4, beta, ZSM-types or pentasil, boralite and omega.

10. The composition as claimed in claim 8, wherein said zeolite selected from the group consisting of faujasite, ultra-stable Y (USY), rare-earth exchanged Y, and dealuminated Y.

11. The composition as claimed in claim 10, wherein said zeolite is selected from the group consisting of ZSM-5, silicalite, boralite, or beta zeolite.

12. The composition as claimed in claims 8, 9, 10, or 11 wherein said zeolite is rare-earth exchanged.

13. The composition as claimed in claims 8, 9, 10, or 11 wherein said zeolite is ammonium exchanged.

14. The composition as claimed in claims 8, 9, 10, or 11 wherein said zeolite is dispersed in refractory oxide matrix.

15. The composition as claimed in claim 12, wherein said zeolite is dispersed in refractory oxide matrix.

16. The composition as claimed in claim 1, wherein said second component comprise from 2 to 50 weight percent of the circulating inventory when said catalyst is used in a fluid catalytic cracking process.

17. The composition as claimed in claim 16, wherein said second component comprises from 3 to 20 weight percent.

18. The composition as claimed in claim 17, wherein said second component comprises from 5 to 10 weight percent.

19. The composition as claimed in claim 1, wherein said second component is further comprised of antimony oxide or bismuth oxide.

* * * * *